(12) United States Patent
Wu et al.

(10) Patent No.: US 11,067,740 B2
(45) Date of Patent: Jul. 20, 2021

(54) DISPLAY ASSEMBLY INCLUDING AT LEAST TWO DISPLAY DEVICES

(71) Applicant: SEAMLESS TECHNOLOGY INC., Taipei (TW)

(72) Inventors: I-Wei Wu, New Taipei (TW); Chih-Lung Hung, New Taipei (TW)

(73) Assignee: SEAMLESS TECHNOLOGY INC., Taipei (TW)

( * ) Notice: Subject to any disclaimer, the term of this patent is extended or adjusted under 35 U.S.C. 154(b) by 0 days.

(21) Appl. No.: 16/685,011

(22) Filed: Nov. 15, 2019

(65) Prior Publication Data

US 2020/0209456 A1 Jul. 2, 2020

(30) Foreign Application Priority Data

Dec. 29, 2018 (CN) .......................... 201811644557.3

(51) Int. Cl.
| | | |
|---|---|---|
| G02B 6/08 | (2006.01) | |
| F21V 8/00 | (2006.01) | |
| G09F 9/302 | (2006.01) | |
| G02F 1/1333 | (2006.01) | |
| G02F 1/1335 | (2006.01) | |
| G02B 6/06 | (2006.01) | |
| G09F 9/30 | (2006.01) | |

(52) U.S. Cl.
CPC ............. *G02B 6/0078* (2013.01); *G02B 6/06* (2013.01); *G02B 6/08* (2013.01); *G02F 1/13336* (2013.01); *G02F 1/133524* (2013.01); *G02F 1/133562* (2021.01); *G09F 9/3026* (2013.01); *G02B 6/001* (2013.01); *G09F 9/301* (2013.01)

(58) Field of Classification Search
None
See application file for complete search history.

(56) References Cited

U.S. PATENT DOCUMENTS

| | | | | |
|---|---|---|---|---|
| 5,129,028 A | * | 7/1992 | Soltan | ...................... G02B 6/08 |
| | | | | 385/115 |
| 2011/0164200 A1 | | 7/2011 | Watanabe | |
| 2014/0354920 A1 | * | 12/2014 | Jang | .................... G02F 1/13336 |
| | | | | 349/73 |
| 2015/0092395 A1 | | 4/2015 | Wu | |
| 2017/0371201 A1 | * | 12/2017 | Yang | ....................... G09F 9/305 |

FOREIGN PATENT DOCUMENTS

| | | | | |
|---|---|---|---|---|
| CN | 102113041 A | | 6/2011 | |
| CN | 104516137 A | | 4/2015 | |
| TW | 201513070 A | | 4/2015 | |
| WO | WO-2010137474 A1 | * | 12/2010 | ............... G09G 3/20 |

* cited by examiner

*Primary Examiner* — Michelle R Connelly
(74) *Attorney, Agent, or Firm* — ScienBiziP, P.C.

(57) ABSTRACT

A display assembly includes at least two display devices and two image compensating elements at a junction of every adjacent two display devices. Each display device includes a front surface that is viewed by user. Each front surface defines a display area and a border area. Each image compensating element is on the front surface. An optical axis direction of each of the image compensating elements is relatively toward above the juxtaposition of the adjacent two display devices. A light guiding sheet is positioned on the light-emitting surface of each of the image compensating elements; an optical axis direction of the light guiding sheet is perpendicular to the front surface.

13 Claims, 6 Drawing Sheets

DISPLAY ASSEMBLY INCLUDING AT LEAST TWO DISPLAY DEVICES

FIELD

The subject matter herein generally relates to a display assembly including at least two display devices.

BACKGROUND

To achieve a large display screen, a plurality of display devices can be coupled (referred to as "splicing") together to achieve a single large display. Each display device has a display area in which a plurality of display pixels is arranged and a border area surrounding the display area. However, when several display devices are spliced together, the border areas appear as grids imposed over the full display image. The displayed images are presented to viewers as non-continuous images.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
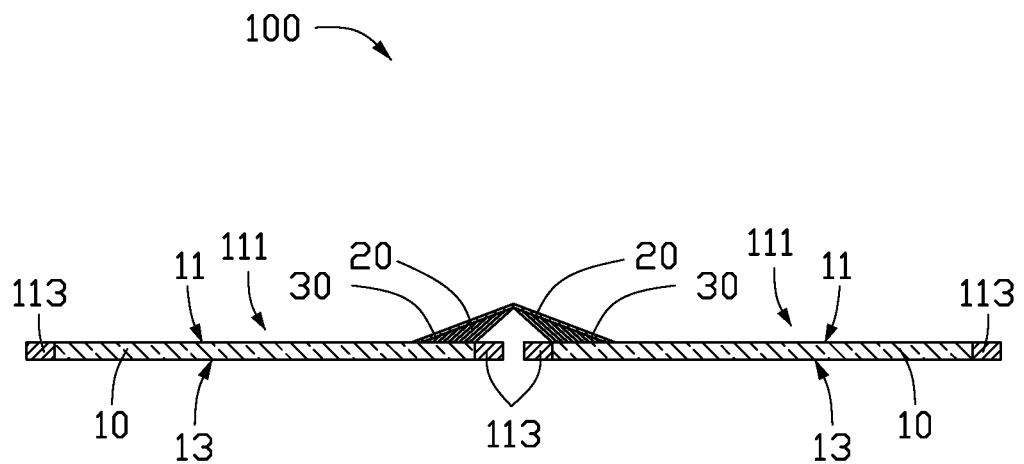
FIG. 1 is a cross-sectional view of a display assembly according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

First Embodiment

Figure 2:
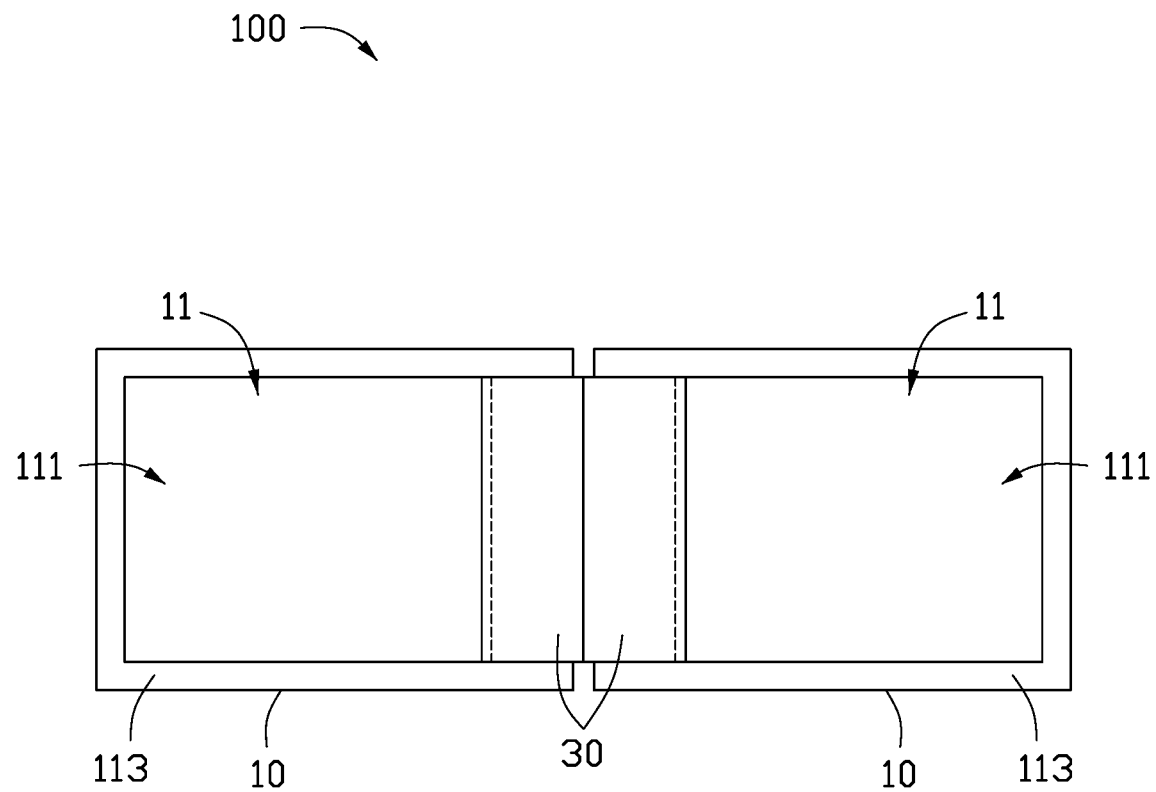
FIG. 2 is a front view of the display assembly of FIG. 1.

FIG. 1 and FIG. 2 illustrate a display assembly 100 of a first embodiment. The display assembly 100 includes two display devices 10 arranged in the manner of a diptych. The two display devices 10 are in one plane. Each display device 10 includes a front surface 11 and a back surface 13 opposite to the front surface 11. The front surface 11 is viewable and may be touched by users. The front surface 11 defines a display area 111 for displaying images and a border area 113 outside the display area 111. The border area 113 surrounds the display area 111. In the present embodiment, the border area 113 is on both sides of the display area 111. The two front surfaces 11 of adjacent display devices 10 are in one plane.

The number of display devices 10 in the display assembly 100 is not limited to two. In other embodiments, the display assembly 100 may include three display devices 10 (with four image compensation components hereinafter described) or four display devices 10 (with six image compensation components), as long as the number of the display devices 10 is at least two.

In the present embodiment, the two display devices are adjacent and spaced apart from each other. The two border areas 113 of the two display devices 10 are at a juxtaposition of the two display devices 10. In the present embodiment, the two border areas 113 of the two display devices 10 are spaced apart from each other. In other embodiments, the two border areas 113 of the two display devices 10 may be in direct contact with each other.

As shown in FIG. 1, in order to view a continuous display screen of the display assembly 100 without being affected by the border areas 113 of adjacent display devices 10, at least one image compensating element 20 and at least one light guiding sheet 30 are provided on a front surface 11 of each display device 10. A portion of an image of the front surface 11 covered by the image compensating element 20 is conducted by the image compensating element 20 and the light guiding sheet 30 such that the display screens of adjacent two display devices 10 form a continuous (non-disconnected) image.

Figure 3:
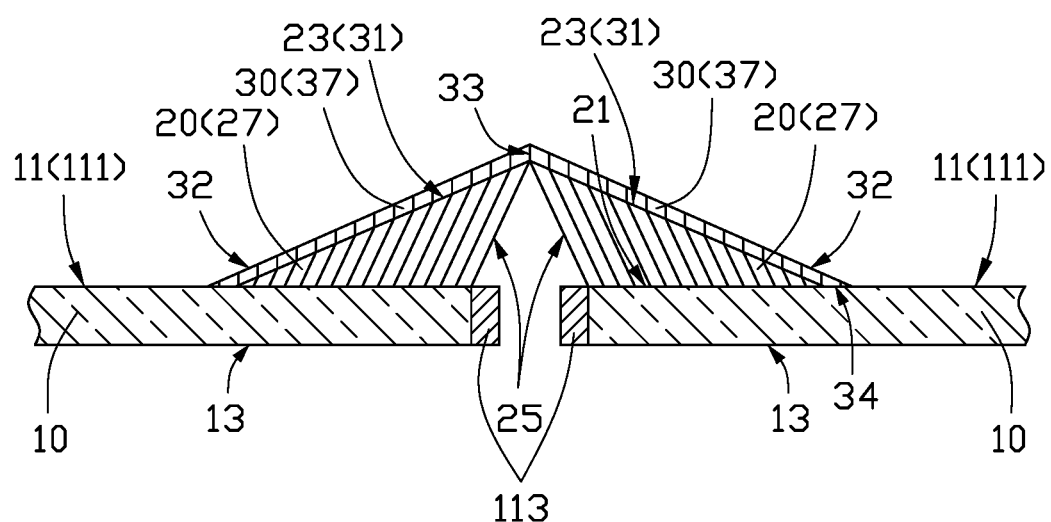
FIG. 3 is an enlarged view of a portion of the display assembly of FIG. 1.

Referring to FIG. 3, two image compensating elements 20 are positioned at a juxtaposition of adjacent display devices 10, one image compensating element 20 is located on one display device 10. Each image compensating element 20 is on the front surface 11, within the display area 111, and adjacent to the border area 113 of the display device 10. The image compensating element 20 does not contact the border area 113 of the front surface 11 but on the front (viewable) side effectively overhangs and conceals the border area 13. In the present embodiment, a portion of the display area 111 that is not covered by the image compensating element 20 is defined as a main display area, and other portion of the display area 111 that is covered by the image compensating element 20 is defined as an infill display area. The infill display area is outside of the main display area.

The image compensating element 20 is a triangular prism. Referring to FIG. 3, a cross section of the image compensating element 20 is substantially triangular. The image compensating element 20 includes a light-incident surface 21, a light-emitting surface 23, and a connecting surface 25. The connecting surface 25 connects both the light-incident surface 21 and the light-emitting surface 23 and is between the light-incident surface 21 and the light-emitting surface 23. The light-incident surface 21, the light-emitting surface 23, and the connecting surface 25 define the three sides of the triangle. The light-incident surface 21, the light-emitting surface 23, and the connecting surface 25 are flat surfaces. The light-incident surface 21 covers a portion of the display area 111 of the front surface 11 of the display device 10 but does not cover the border area 113. In this embodiment, an edge of the light-incident surface 21 near the juxtaposition is aligned with an edge of the frame region 113 near the display region 111 to prevent light leaking from a position between the border area 113 and the image compensating element 20. The light-emitting surface 23 intersects with the light-incident surface 21 to form an acute angle. The connecting surface 25 is between the light-emitting surface 23 and the light-incident surface 21.

Figure 6:
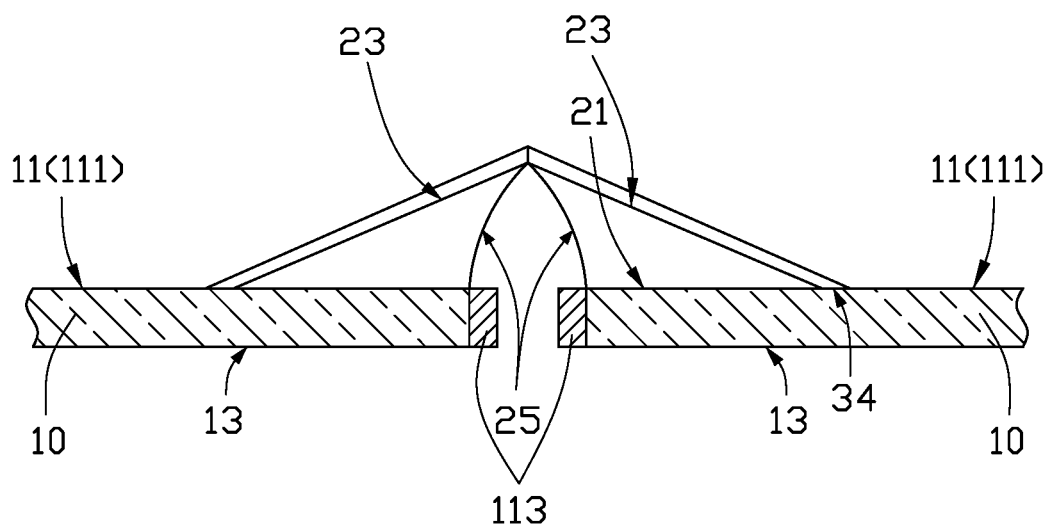
FIG. 6 is an enlarged view of a portion of the display assembly according to a modified embodiment of FIG. 3.

In a modified embodiment, as shown in FIG. 6, a cross section of the image compensating element 20 is not triangular. Both the light-incident surface 21 and the light-emitting surface 23 are flat surfaces, and the connecting surface 25 is a curved surface. The shape of the connecting surface 25 is not limited as shown in FIG. 6, but can be other curved shapes. In this case, the image compensating element 20 can be formed by pressing and cutting a bundle of light guiding fibers.

As shown in FIG. 3, the image compensating element 20 includes a plurality of light guiding channels 27. Light guiding paths of the light guiding channels 27 are independent from each other and the light guiding channels 27 extend along a direction from the light-incident surface 21 toward the light-emitting surface 23. The light guiding channels 27 are bundled together to form the image compensating element 20. In the present embodiment, a portion of the light guiding channels 27 of each image compensating element 20 are inclined towards above the border area 113. In this embodiment, extending directions of the light guiding channels 27 are substantially uniform and the light guiding channels 27 are in an array. An area size of the light-emitting surface 23 is greater than an area size of the light-incident surface 21. An area size of each light guiding channel 27 on the light-incident surface 21 is smaller than an area size of the light guiding channel 27 on the light-emitting surface 23 and an end surface of each light guiding channel 27 on the light-emitting surface 23 forms a slope. Each image compensating element 20 conducts a portion of the image towards the adjacent display device 10.

As shown in FIG. 3, one light guiding sheet 30 is positioned on the light-emitting surface 23 of each image compensating element 20. The light guiding sheet 30 and the image compensating element 20 are made of a same material. The light guiding sheet 30 also includes a plurality of light guiding channels 37 that are independent from each other. The extending direction of the light guiding channel 37 forms an angle with the extending direction of the light guiding channel 27.

The light-emitting direction of the image compensating element 20 is generally toward above the juxtaposition of the adjacent two display devices 10, and the light guiding sheet 30 guides the optical axis of the emitted light to be perpendicular to the front surface 11 of the display device 10, thus giving uniformity to the overall light-emitting direction of the display assembly 100. That is, an extending direction of the light guiding channels 37 of the light guiding sheet 30 is perpendicular to the front surface 11 of the corresponding display device 10. In additional, the light-guiding sheet 30 also solves a problem of uneven brightness of the image compensating element 20, and the brightness of the image compensating element 20 is uniform to the viewer-user.

As shown in FIG. 3, the light guiding sheet 30 includes a light-incident surface 31 attached to the light-emitting surface 23 of the image compensating element 20. The light guiding sheet 30 also includes a light-emitting surface 32 parallel to and opposite to the light-incident surface 31, and first and second connecting surfaces 33 and 34 coupled between the light-incident surface 31 and the light-emitting surface 32. In the present embodiment, a top view or a cross-sectional view of the light guiding sheet 30 reveals a trapezoid. Each light guiding channel 37 extends in a direction from the light-incident surface 31 toward the light-emitting surface 32. The extending direction of the light guiding channel 37 is parallel to the first connecting surface 33. The two first connecting surfaces 33 of adjacent light guiding sheets 30 are in a direct contact.

In the present embodiment, as shown in FIG. 3, the light guiding sheet 30 completely covers the light-emitting surface 23 of the image compensating element 20 and also extends and partially covers the display area 111 of the front surface 11 of the display device 10. As shown in FIG. 3, the second connecting surface 34 is attached to the display area 111 of the front surface 11. In other embodiments, as shown in FIG. 4, the light guiding sheet 30 covers the light-emitting surface 23 of the image compensating element 20, but the second connecting surface 34 is not attached to the display area 111 of the front surface 11.

Figure 4:
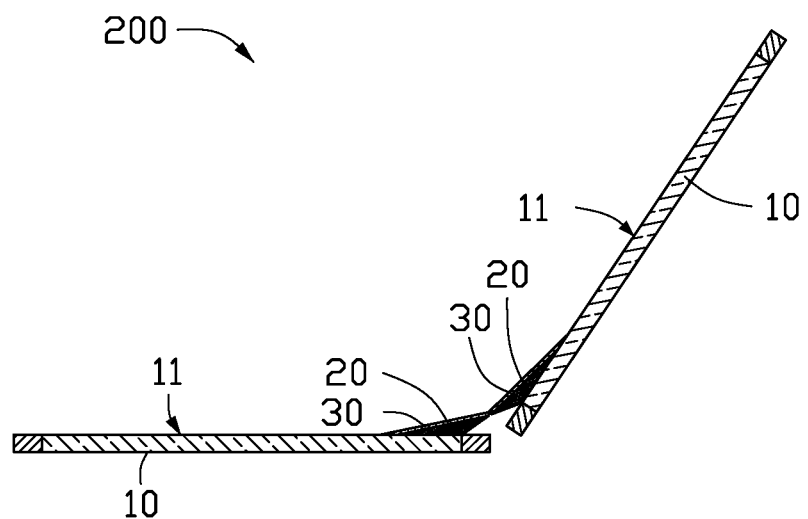
FIG. 4 is a cross-sectional view of a display assembly according to a second embodiment of the present disclosure.

Referring to FIG. 3 and FIG. 4, the two light-emitting surfaces 32 of the two light guiding sheets 30 at the juxtaposition of two adjacent display devices 10 are coupled together.

Each light guiding channel 27 and each light guiding channel 37 can be a light guiding fiber. In the present embodiments, the light guiding fiber may be a plastic optical fiber, a quartz optical fiber, a glass optical fiber, or the like.

As shown in FIG. 3, light from the main display area of the display device 10 is emitted directly to the user, and the user can view all of the main display area. Light from the pixels of the infill display area of the display device 10 enters into the light guiding channels 27 from the light-incident surface 21 of the compensating element 20 and then enters into the light guiding channels 37 of the light guiding sheet 30, being finally emitted from the light-emitting surface 32 of the light guiding sheet 30. The juxtapositioning of adjacent light guiding sheets 30 masks the border areas 113 at the juxtaposition of adjacent display devices 10, so that the display screen of the display assembly 100 presents a continuous, seamless image. The image compensating elements 20 and the light guiding sheets 30 extend images corresponding to the infill display areas at the juxtaposition of adjacent display devices 10, and the border areas 113 are masked from view, thus a seamless display can be achieved. Images presented on the display devices 10 are visually seamless when the image compensating elements 20 and the light guiding sheets 30 are used.

The display assembly 100 of the present embodiment can be applied to a video wall or an outdoor large billboard.

Second Embodiment

Figure 5:
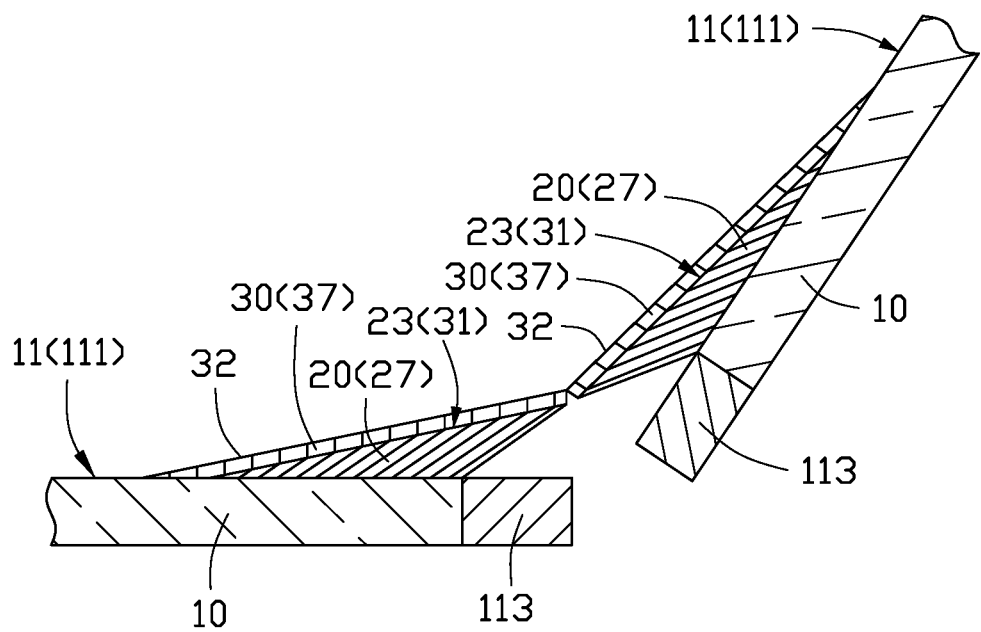
FIG. 5 is an enlarged view of a portion of the display assembly of FIG. 4.

FIG. 4 and FIG. 5 illustrate a display assembly 200 of a second embodiment. The display assembly 200 is substantially the same as the display assembly 100 of the first embodiment, and includes two display devices 10, two image compensating elements 20, and two light guiding sheets 30. In the present embodiment, each light guiding sheet 30 is positioned on the light-emitting surface 23 of one image compensating element 20; an extending direction of each light guiding channels 37 is perpendicular to the front surface 11 of the display device 10, the two light-emitting surfaces 32 of the two light guiding sheets 30 at the juxtaposition of two adjacent display devices 10 are directly coupled together.

The difference between the first embodiment and the second embodiment is that the two display devices 10 are not arranged in one plane. In the present embodiment, the front surfaces 11 of the two display devices 10 are not in a straight line but intersect to form an angle of less than 180 degrees.

In the present embodiment, the image compensating elements 20 on the adjacent two adjacent display devices 10 are spaced apart from each other, and the light-emitting surfaces 23 of the two image compensating elements 20 are not connected. Without the light guiding sheet 30, the user would see a discontinuous display when viewing the front surface 11. The light-emitting surfaces 32 of the two light guiding sheets 30 are directly connected, thus the user of light guiding sheet 30 may view a seamless display.

The number of display devices 10 included in the display assembly 200 is at least two.

In the present embodiment, the two adjacent display devices 10 are spaced apart from each other, and the border areas 113 of the two display devices 10 are adjacent to and spaced apart from each other. In other embodiments, the two adjacent display devices 10 may be in direct contact with each other, and the border areas 113 may be in direct contact with each other.

The image compensating element 20 and the light guiding sheet 30 may be formed by cutting a light guiding fiber block (not shown), wherein the light guiding fiber block comprises a plurality of light guiding fibers extending in a predetermined direction and arranged closely in an array (not shown).

It can be understood that the light guiding channel of the image compensating element 20 in the above described first and second embodiments can be linearly extended, but is not limited to being extended linearly, and may be set in various curves.

The display device 10 can be a liquid crystal display device, an organic light emitting diode display device, a micro-light emitting diode display device, and the like.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A display assembly, comprising:
   at least two display devices, each of the at least two display devices comprising a front surface adapted for displaying image, the front surface defining a display area and a border area outside the display area; and
   two image compensating elements at a juxtaposition of every adjacent two of the display devices, each of the two image compensating elements being on the front surface of one of the adjacent two display devices;
   each of the image compensating elements comprising a light-incident surface on the display area, a light-emitting surface coupling to the light-incident surface, and a connecting surface coupling between the light-incident surface and the light-emitting surface;
   wherein each of the image compensating elements comprises a plurality of light guiding channels; light guiding paths of the plurality of light guiding channels are independent from each other and extend along a direction from the light-incident surface toward the light-emitting surface;
   wherein a light guiding sheet is positioned on the light-emitting surface of each of the image compensating elements; the light guiding sheet comprises a plurality of light guiding channels independent from each other; the light guiding channels of the light guiding sheet are communicately coupled to the light guiding channels of a corresponding one of the image compensating elements; an extending direction of the light guiding channels of the light guiding sheet is perpendicular to the front surface of the corresponding display device; the extending direction of the light guiding channels of the light guiding sheet and an extending direction of the light guiding channels of the image compensating element intersect to form an angle;
   wherein the light guiding sheet covers the light-emitting surface of the image compensating element and extends to cover a portion of the display area of the front surface of the display device; the light guiding sheet is in direct contact with the front surface of the display device.

2. The display assembly of claim 1, wherein the light guiding sheet comprises a light-incident surface attached to the light-emitting surface of the corresponding image compensating element, and a light-emitting surface parallel to and opposite to the light-incident surface of the light guiding sheet; the light guiding channels of the light guiding sheet extend from the light-incident surface of the light guiding sheet toward the light-emitting surface of the light guiding sheet.

3. The display assembly of claim 2, wherein two light-emitting surfaces of two light guiding sheets at the juxtaposition of every adjacent two of the display devices are coupled together.

4. The display assembly of claim 2, wherein the light guiding sheet further comprises a first connecting surface and a second connecting surface each coupled between the light-incident surface of the light guiding sheet and the light-emitting surface of the light guiding sheet; the first connecting surface is opposite to the second connecting surface; an extending direction of each of the plurality of light guiding channels of the light guiding sheet is parallel to the first connecting surface.

5. The display assembly of claim 4, wherein the the second connecting surface is attached to the display area of the front surface.

6. The display assembly of claim 1, wherein each of the image compensating elements defines an acute angle formed by the light-emitting surface intersects with the light-incident surface.

7. The display assembly of claim 1, wherein for each of the image compensating elements, an area size of the light-incident surface is smaller than an area size of the light-emitting surface.

8. The display assembly of claim 7, wherein for each of the image compensating elements, a cross-sectional area size of each of the light guiding channels on the light-incident surface is smaller than a cross-sectional area size of each of the light guiding channels on the light-emitting surface.

9. The display assembly of claim 1, wherein the front surfaces of the at least two display devices are in one plane.

10. The display assembly of claim 1, wherein the front surfaces of any two adjacent of the at least two display devices intersect to form an angle of less than 180 degrees.

11. The display assembly of claim 1, wherein the two image compensating elements at a juxtaposition of every adjacent two of the display devices are spaced apart from each other.

12. The display assembly of claim 1, wherein the light-incident surface, the light-emitting surface, and the connecting surface are flat surfaces.

13. The display assembly of claim 1, wherein both the light-incident surface and the light-emitting surface are flat surfaces, and the connecting surface is a curved surface.

* * * * *